(12) United States Patent
Hong et al.

(10) Patent No.: US 12,730,266 B1
(45) Date of Patent: Sep. 8, 2026

(54) WAVEGUIDE DISPLAY WITH TOTAL INTERNAL REFLECTION BAND BETWEEN COLOR CHANNELS

(71) Applicant: Apple Inc., Cupertino, CA (US)

(72) Inventors: Jong Young Hong, Boulder, CO (US); Lai Wang, Scotts Valley, CA (US); Byron R Cocilovo, Boulder, CO (US); Friso Schlottau, Mead, CO (US)

(73) Assignee: Apple Inc., Cupertino, CA (US)

( * ) Notice: Subject to any disclaimer, the term of this patent is extended or adjusted under 35 U.S.C. 154(b) by 258 days.

(21) Appl. No.: 18/744,279

(22) Filed: Jun. 14, 2024

Related U.S. Application Data

(60) Provisional application No. 63/511,503, filed on Jun. 30, 2023.

(51) Int. Cl.
*G02B 6/34* (2006.01)
*G02B 27/01* (2006.01)

(52) U.S. Cl.
CPC ........... *G02B 6/34* (2013.01); *G02B 27/0172* (2013.01); *G02B 2027/0112* (2013.01); *G02B 2027/0174* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 8,160,411 | B2 | 4/2012 | Levola et al. |
| 10,823,894 | B2 | 11/2020 | Peroz et al. |
| 10,983,263 | B2 | 4/2021 | Kleinman et al. |
| 11,460,609 | B2 | 10/2022 | Peroz et al. |
| 12,216,282 | B2 * | 2/2025 | Aieta ................ G02B 27/0172 |
| 2009/0129116 | A1 | 5/2009 | Kim et al. |
| 2021/0072437 | A1 | 3/2021 | Singh et al. |

(Continued)

FOREIGN PATENT DOCUMENTS

| | | | |
|---|---|---|---|
| CN | 109239842 | A | 1/2019 |
| EP | 2733517 | A1 | 5/2014 |
| WO | 2020243111 | A1 | 12/2020 |

(Continued)

OTHER PUBLICATIONS

U.S. Appl. No. 18/349,567, filed Jul. 10, 2023.

(Continued)

*Primary Examiner* — Richard H Kim
(74) *Attorney, Agent, or Firm* — Treyz Law Group, P.C.; Michael H. Lyons

(57) ABSTRACT

A display may include a waveguide having a grating medium sandwiched between first and second substrates. A cross-coupler can direct light in the waveguide towards an output coupler. The output coupler may include volume holograms in the medium. The output coupler may couple the light out of the waveguide and towards an eye box. The cross-coupler may include a surface relief grating (SRG). The SRG may diffract an entirety of the fields of view of different color channels of light incident upon the SRG from within a total internal reflection (TIR) range of the waveguide onto angles at opposing sides of a TIR transition angle of the waveguide. This may prevent the formation of unsightly dark bands in one or more of the color channels at the eye box.

20 Claims, 7 Drawing Sheets

(56) References Cited

U.S. PATENT DOCUMENTS

2022/0128817 A1 4/2022 Singh et al.

FOREIGN PATENT DOCUMENTS

WO 2022235804 A1 11/2022
WO 2023003854 A1 1/2023

OTHER PUBLICATIONS

Bernard C. Kress et al., Waveguide combiners for mixed reality headsets: a nanophotonics design perspective, Nanophotonics, Oct. 7, 2020, pp. 41-74, vol. 10, No. 1, De Gruyter.
Jiasheng Xiao et al., Design of achromatic surface microstructure for near-eye display with diffractive waveguide, Optics Communications, Apr. 5, 2019, pp. 411-416, vol. 452, Elsevier, Amsterdam, NL.
U.S. Appl. No. 18/414,126, filed Jan. 16, 2024.
Richard G. Lyon et al., Externally Occulted Terrestrial Planet Finder Coronagraph: Simulations and Sensitivities, Proceedings of SPIE—The International Society for Optical Engineering, Dec. 2007, Society of Photo-optical Instrumentation Engineers, Bellingham, WA, United States.
U.S. Appl. No. 18/469,451, filed Sep. 18, 2023.

* cited by examiner

WAVEGUIDE DISPLAY WITH TOTAL INTERNAL REFLECTION BAND BETWEEN COLOR CHANNELS

This application claims the benefit of U.S. Provisional Patent Application No. 63/511,503, filed Jun. 30, 2023, which is hereby incorporated by reference herein in its entirety.

BACKGROUND

This disclosure relates to optical systems such as optical systems in electronic devices having displays.

Electronic devices can include displays that provide images near the eyes of a user. Such electronic devices often include virtual or augmented reality headsets with displays having optical elements that allow users to view the displays. If care is not taken, components used to display images can be bulky and might not exhibit desired levels of optical performance. For example, boundaries between optical elements can cause unsightly cosmetic artifacts that detract from the appearance of the images.

SUMMARY

An aspect of the disclosure provides an electronic device. The electronic device can include a waveguide having a first substrate, a second substrate, and a grating medium sandwiched between the first substrate and the second substrate, wherein the first substrate is configured to propagate at least a first color channel and a second color channel of light via total internal reflection (TIR). The electronic device can include a third substrate on the waveguide. The electronic device can include a first optical coupler configured to couple the light into the waveguide. The electronic device can include a second optical coupler configured to couple the light out of the waveguide, the second optical coupler comprising volume holograms in the grating medium. The electronic device can include a third optical coupler configured to redirect the light from the first optical coupler towards the second optical coupler, wherein the third optical coupler comprises a surface relief grating (SRG) in the third substrate, the SRG is configured to diffract the first color channel of the light onto first angles within a TIR range of the first substrate, and the SRG is configured to diffract the second color channel of the light onto second angles outside the TIR range of the first substrate.

An aspect of the disclosure provides an electronic device. The electronic device can include a waveguide having a first substrate, a second substrate, a grating medium interposed between the first substrate and the second substrate, and a third substrate layered between the grating medium and the first substrate, the waveguide being configured to propagate light via total internal reflection (TIR). The electronic device can include volume holograms in the grating medium and configured to couple the light out of the waveguide. The electronic device can include a surface relief grating (SRG) in the third substrate. The SRG can be configured to receive the light from within the first substrate. The SRG can be configured to diffract the light towards the volume holograms. The light can have a first color channel. The light can have a second color channel different from the first color channel. The SRG can be configured to diffract the first color channel of the light onto a first side of a TIR transition angle of the first substrate. The SRG can be configured to diffract the second color of the light onto a second side of the TIR transition angle of the first substrate.

An aspect of the disclosure provides an electronic device. The electronic device can include a first substrate. The electronic device can include a second substrate. The electronic device can include a grating medium interposed between the first substrate and the second substrate, wherein the first substrate is configured to propagate at least a first color channel and a second color channel of light via total internal reflection (TIR). The electronic device can include a third substrate layered between the first substrate and the grating medium. The electronic device can include a surface relief grating (SRG) in the third substrate. The SRG can be configured to diffract the first color channel of the light from a first k-space region onto a second k-space region. The SRG can be configured to diffract the second color channel of the light from the first k-space region onto a third k-space region, the first substrate having a TIR transition angle between the second k-space region and the third k-space region.

DETAILED DESCRIPTION

Figure 1:
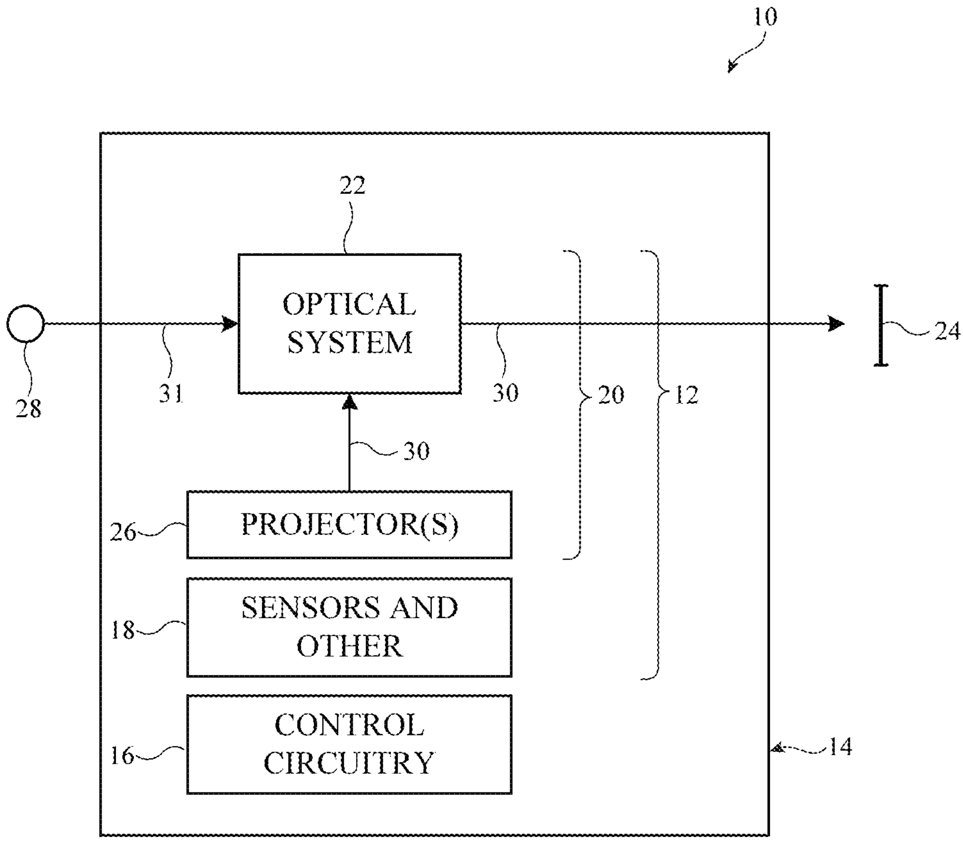
FIG. 1 is a diagram of an illustrative system having a display in accordance with some embodiments.

System 10 of FIG. 1 may be a head-mounted device having one or more displays. The displays in system 10 may include near-eye displays 20 mounted within support structure (housing) 14. Support structure 14 may have the shape of a pair of eyeglasses or goggles (e.g., supporting frames), may form a housing having a helmet shape, or may have other configurations to help in mounting and securing the components of near-eye displays 20 on the head or near the eye of a user. Near-eye displays 20 may include one or more display projectors such as projectors 26 (sometimes referred to herein as display modules 26) and one or more optical systems such as optical systems 22. Projectors 26 may be mounted in a support structure such as support structure 14. Each projector 26 may emit image light 30 that is redirected towards a user's eyes at eye box 24 using an associated one of optical systems 22. Image light 30 may be, for example, light that contains and/or represents something viewable such as a scene or object (e.g., as modulated onto the image light using the image data provided by the control circuitry to the display module).

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.).

Projectors 26 may include liquid crystal displays, organic light-emitting diode displays, laser-based displays, or displays of other types. Projectors 26 may include light sources, emissive display panels, transmissive display panels that are illuminated with illumination light from light sources to produce image light, reflective display panels such as digital micromirror display (DMD) panels and/or liquid crystal on silicon (LCOS) display panels that are illuminated with illumination light from light sources to produce image light 30, etc.

Optical systems 22 may form lenses that allow a viewer (see, e.g., a viewer's eyes at eye box 24) to view images on display(s) 20. There may be two optical systems 22 (e.g., for forming left and right lenses) associated with respective left and right eyes of the user. A single display 20 may produce images for both eyes or a pair of displays 20 may be used to display images. In configurations with multiple displays (e.g., left and right eye displays), the focal length and positions of the lenses formed by system 22 may be selected so that any gap present between the displays will not be visible to a user (e.g., so that the images of the left and right displays overlap or merge seamlessly).

If desired, optical system 22 may contain components (e.g., an optical combiner, etc.) to allow real-world light 31 (sometimes referred to herein as world light 31 or ambient light 31) produced and/or reflected from real-world objects 28 (sometimes referred to herein as external objects 28) to be combined optically with virtual (computer-generated) images such as virtual images in image light 30. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement in which a camera captures real-world images of external objects and this content is digitally merged with virtual content at optical system 22).

System 10 may, if desired, include wireless circuitry and/or other circuitry to support communications with a computer or other external equipment (e.g., a computer that supplies display 20 with image content). During operation, control circuitry 16 may supply image content to display 20. The content may be remotely received (e.g., from a computer or other content source coupled to system 10) and/or may be generated by control circuitry 16 (e.g., text, other computer-generated content, etc.). The content that is supplied to display 20 by control circuitry 16 may be viewed by a viewer at eye box 24.

Figure 2:
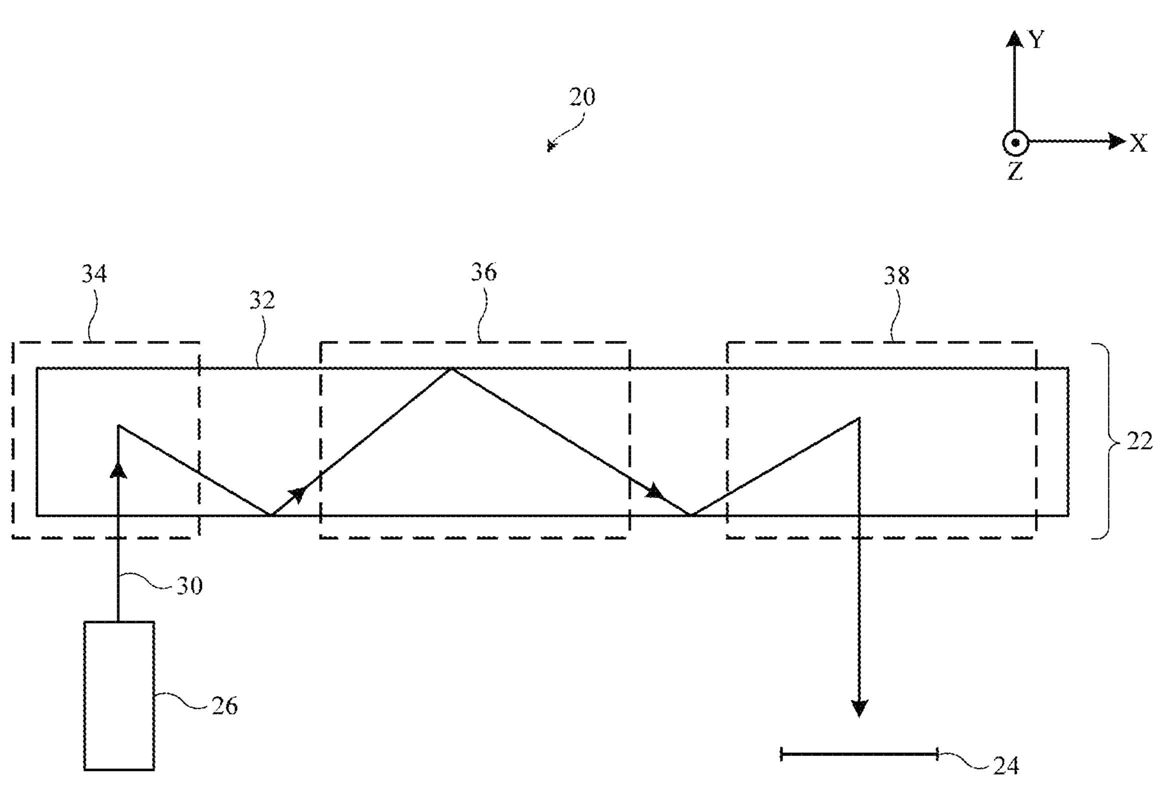
FIG. 2 is a top view of an illustrative optical system for a display having a waveguide with optical couplers in accordance with some embodiments.

FIG. 2 is a top view of an illustrative display 20 that may be used in system 10 of FIG. 1. As shown in FIG. 2, display 20 may include a projector such as projector 26 and an optical system such as optical system 22. Optical system 22 may include optical elements such as one or more waveguides 32. Waveguide 32 may include one or more stacked substrates (e.g., stacked planar and/or curved layers sometimes referred to herein as waveguide substrates) of optically transparent material such as plastic, polymer, glass, etc.

If desired, waveguide 32 may also include one or more layers of holographic recording media (sometimes referred to herein as holographic media, grating media, or diffraction grating media) on which one or more diffractive gratings are recorded (e.g., holographic phase gratings, sometimes referred to herein as holograms, surface relief gratings, etc.). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating medium may include photopolymers, gelatin such as dichromated gelatin, silver halides, holographic polymer dispersed liquid crystal, or other suitable holographic media.

Diffractive gratings on waveguide 32 may include holographic phase gratings such as volume holograms or thin-film holograms, meta-gratings, or any other desired diffractive grating structures. The diffractive gratings on waveguide 32 may also include surface relief gratings (SRGs) formed on one or more surfaces of the substrates in waveguide 32 (e.g., as modulations in thickness of a SRG medium layer), gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles). Other light redirecting elements such as louvered mirrors may be used in place of diffractive gratings in waveguide 32 if desired.

As shown in FIG. 2, projector 26 may generate (e.g., produce and emit) image light 30 associated with image content to be displayed to eye box 24 (e.g., image light 30 may convey a series of image frames for display at eye box 24). Image light 30 may be collimated using a collimating lens in projector 26 if desired. Optical system 22 may be used to present image light 30 output from projector 26 to eye box 24. If desired, projector 26 may be mounted within support structure 14 of FIG. 1 while optical system 22 may be mounted between portions of support structure 14 (e.g., to form a lens that aligns with eye box 24). Other mounting arrangements may be used, if desired.

Optical system 22 may include one or more optical couplers (e.g., light redirecting elements) such as input coupler 34, cross-coupler 36, and output coupler 38. In the example of FIG. 2, input coupler 34, cross-coupler 36, and output coupler 38 are formed at or on waveguide 32. Input coupler 34, cross-coupler 36, and/or output coupler 38 may be completely embedded within the substrate layers of waveguide 32, may be partially embedded within the substrate layers of waveguide 32, may be mounted to waveguide 32 (e.g., mounted to an exterior surface of waveguide 32), etc.

Waveguide 32 may guide image light 30 down its length via total internal reflection. Input coupler 34 may be configured to couple image light 30 from projector 26 into waveguide 32 (e.g., within a total-internal reflection (TIR) range of the waveguide within which light propagates down the waveguide via TIR), whereas output coupler 38 may be configured to couple image light 30 from within waveguide 32 (e.g., propagating within the TIR range) to the exterior of waveguide 32 and towards eye box 24 (e.g., at angles outside of the TIR range). Input coupler 34 may include an input coupling prism, an edge or face of waveguide 32, a lens, a steering mirror or liquid crystal steering element, diffractive grating structures (e.g., volume holograms, SRGs, etc.), partially reflective structures (e.g., louvered mirrors), or any other desired input coupling elements.

As an example, projector 26 may emit image light 30 in direction+Y towards optical system 22. When image light 30 strikes input coupler 34, input coupler 34 may redirect image light 30 so that the light propagates within waveguide 32 via total internal reflection towards output coupler 38 (e.g., in direction+X within the TIR range of waveguide 32). When image light 30 strikes output coupler 38, output coupler 38 may redirect image light 30 out of waveguide 32 towards eye box 24 (e.g., back along the Y-axis). In implementations where cross-coupler 36 is formed on waveguide 32, cross-coupler 36 may redirect image light 30 in one or more directions as it propagates down the length of waveguide 32 (e.g., towards output coupler 38 from a direction of propagation as coupled into the waveguide by the input coupler). In redirecting image light 30, cross-coupler 36 may also perform pupil expansion on image light 30 in one or more directions. In expanding pupils of the image light, cross-coupler 36 may, for example, help to reduce the vertical size of waveguide 32 (e.g., in the Z direction) relative to implementations where cross-coupler 36 is omitted. Cross-coupler 36 may therefore sometimes also be referred to herein as pupil expander 36 or optical expander 36. If desired, output coupler 38 may also expand image light 30 upon coupling the image light out of waveguide 32.

Input coupler 34, cross-coupler 36, and/or output coupler 38 may be based on reflective and refractive optics or may be based on diffractive (e.g., holographic) optics. In arrangements where couplers 34, 36, and 38 are formed from reflective and refractive optics, couplers 34, 36, and 38 may include one or more reflectors (e.g., an array of micromirrors, partial mirrors, louvered mirrors, or other reflectors). In arrangements where couplers 34, 36, and 38 are based on diffractive optics, couplers 34, 36, and 38 may include diffractive gratings (e.g., volume holograms, surface relief gratings, etc.).

The example of FIG. 2 is merely illustrative. Optical system 22 may include multiple waveguides that are laterally and/or vertically stacked with respect to each other. Each waveguide may include one, two, all, or none of couplers 34, 36, and 38. Waveguide 32 may be at least partially curved or bent if desired. One or more of couplers 34, 36, and 38 may be omitted. If desired, optical system 22 may include a single optical coupler that performs the operations of both cross-coupler 36 and output coupler 38 (sometimes referred to herein as an interleaved coupler, a diamond coupler, or a diamond expander) or cross-coupler 36 may be separate from output coupler 38. Implementations in which cross-coupler 36 or a single optical coupler that performs the operations of both cross-coupler 36 and output coupler 38 (e.g., which receives light from an input coupler) include surface relief gratings (SRGs) are described herein as an example.

Figure 3A:
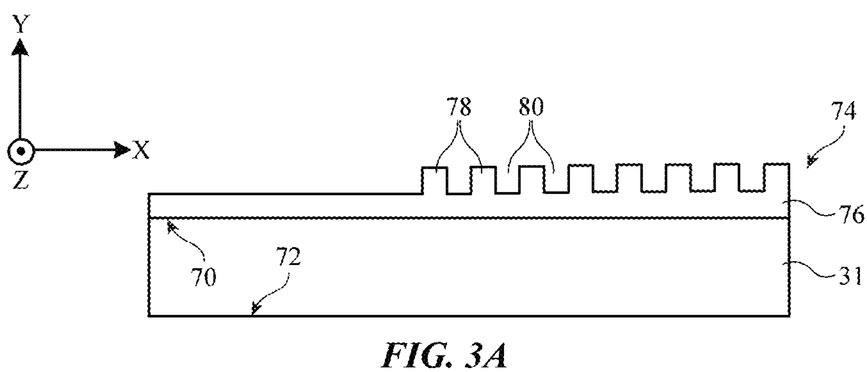
FIGS. 3A-3C are top views of illustrative waveguides provided with a surface relief grating in accordance with some embodiments.

FIG. 3A is a top view showing one example of how a surface relief grating may be formed on waveguide 32. As shown in FIG. 3A, waveguide 32 may have a first lateral surface 70 and a second lateral surface 72 opposite lateral surface 70 (sometimes referred to herein as waveguide surfaces). Waveguide 32 may include any desired number of one or more stacked waveguide substrates. If desired, waveguide 32 may also include a layer of grating medium sandwiched (interposed) between first and second waveguide substrates (e.g., where the first waveguide substrate includes lateral surface 70 and the second waveguide substrate includes lateral surface 72).

Waveguide 32 may be provided with a surface relief grating (SRG) such as surface relief grating 74. SRG 74 may be included in cross-coupler 36 or as part of an optical coupler that performs the operations of both cross-coupler 36 and output coupler 38 (e.g., a diamond expander or interleaved coupler), for example. SRG 74 may be formed within a substrate such as a layer of SRG substrate 76 (sometimes referred to herein as medium 76, medium layer 76, SRG medium 76, or SRG medium layer 76). While only a single SRG 74 is shown in SRG substrate 76 in FIG. 3A for the sake of clarity, SRG substrate 76 may include two or more SRGs 74 (e.g., SRGs having different respective grating vectors). If desired, at least a portion of each of the SRGs may be superimposed in the same volume of SRG substrate 76. In the example of FIG. 3A, SRG substrate 76 is layered onto lateral surface 70 of waveguide 32. This is merely illustrative and, if desired, SRG substrate 76 may be layered onto lateral surface 72 (e.g., the surface of waveguide 32 that faces the eye box).

SRG 74 may include peaks 78 and troughs 80 in the thickness of SRG substrate 76. Peaks 78 may sometimes also be referred to herein as ridges 78 or maxima 78. Troughs 80 may sometimes also be referred to herein as notches 80, slots 80, grooves 80, or minima 80. In the example of FIG. 3A, SRG 74 is illustrated for the sake of clarity as a binary structure in which SRG 74 is defined either by a first thickness associated with ridges 78 or a second thickness associated with troughs 80. This is merely illustrative. If desired, SRG 74 may be non-binary (e.g., may include any desired number of thicknesses following any desired profile, may include ridges 78 that are angled at non-parallel fringe angles with respect to the Y axis, etc.)., may include ridges 78 with surfaces that are tilted (e.g., oriented outside of the X-Z plane), may include troughs 80 that are tilted (e.g., oriented outside of the X-Z plane), may include ridges 78 and/or troughs 80 that have heights and/or depths that follow a modulation envelope, etc. If desired, SRG substrate 76 may be adhered to lateral surface 70 of waveguide 32 using a layer of optically clear adhesive (not shown). SRG 74 may be fabricated separately from waveguide 32 and may be adhered to waveguide 32 after fabrication or may be etched into SRG substrate 76 after SRG substrate 76 has already been layered on waveguide 32, for example.

Figure 3B:
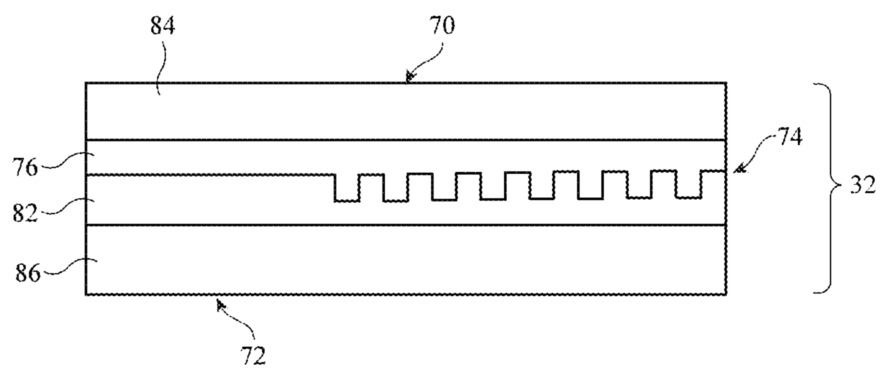

The example of FIG. 3A is merely illustrative. In another implementation, SRG 74 may be placed at a location within the interior of waveguide 32, as shown in the example of FIG. 3B. As shown in FIG. 3B, waveguide 32 may include a first waveguide substrate 84, a second waveguide substrate 86, and a media layer 82 interposed between waveguide substrate 84 and waveguide substrate 86. Media layer 82 may be a grating or holographic recording medium, a layer of adhesive, a polymer layer, a layer of waveguide substrate, or any other desired layer within waveguide 32. SRG substrate 76 may be layered onto the surface of waveguide substrate 84 that faces waveguide substrate 86. Alternatively, SRG substrate 76 may be layered onto the surface of waveguide substrate 86 that faces waveguide substrate 84.

Figure 3C:
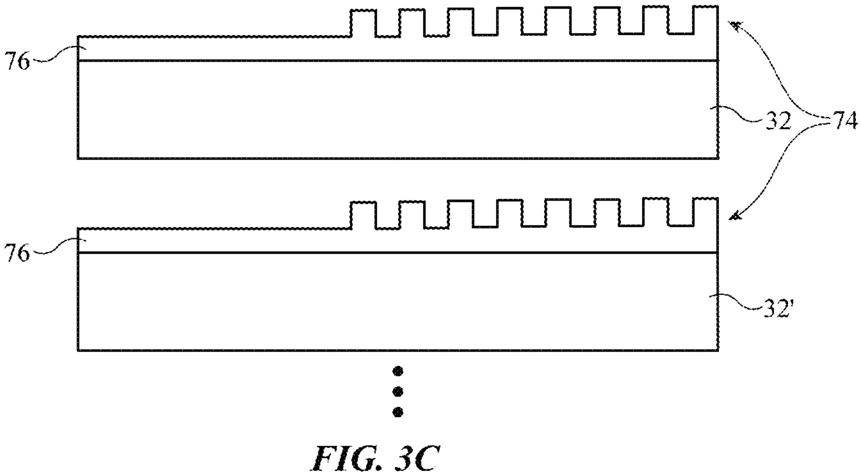

If desired, multiple SRGs 74 may be distributed across multiple layers of SRG substrate, as shown in the example of FIG. 3C. As shown in FIG. 3C, the optical system may include multiple stacked waveguides such as at least a first waveguide 32 and a second waveguide 32'. A first SRG substrate 76 may be layered onto one of the lateral surfaces of waveguide 32 whereas a second SRG substrate 76' is layered onto one of the lateral surfaces of waveguide 32'. First SRG substrate 76 may include one or more of the SRGs 74. Second SRG substrate 76' may include one or more of the SRGs 74. This example is merely illustrative. If desired, the optical system may include more than two stacked waveguides. In examples where the optical system includes more than two waveguides, each waveguide that is provided with an SRG substrate may include one or more SRG 74. While described herein as separate waveguides, waveguides 32 and 32' of FIG. 3C may also be formed from respective waveguide substrates of the same waveguide, if desired. The arrangements in FIGS. 3A, 3B, and/or 3C may be combined if desired.

Figure 4:
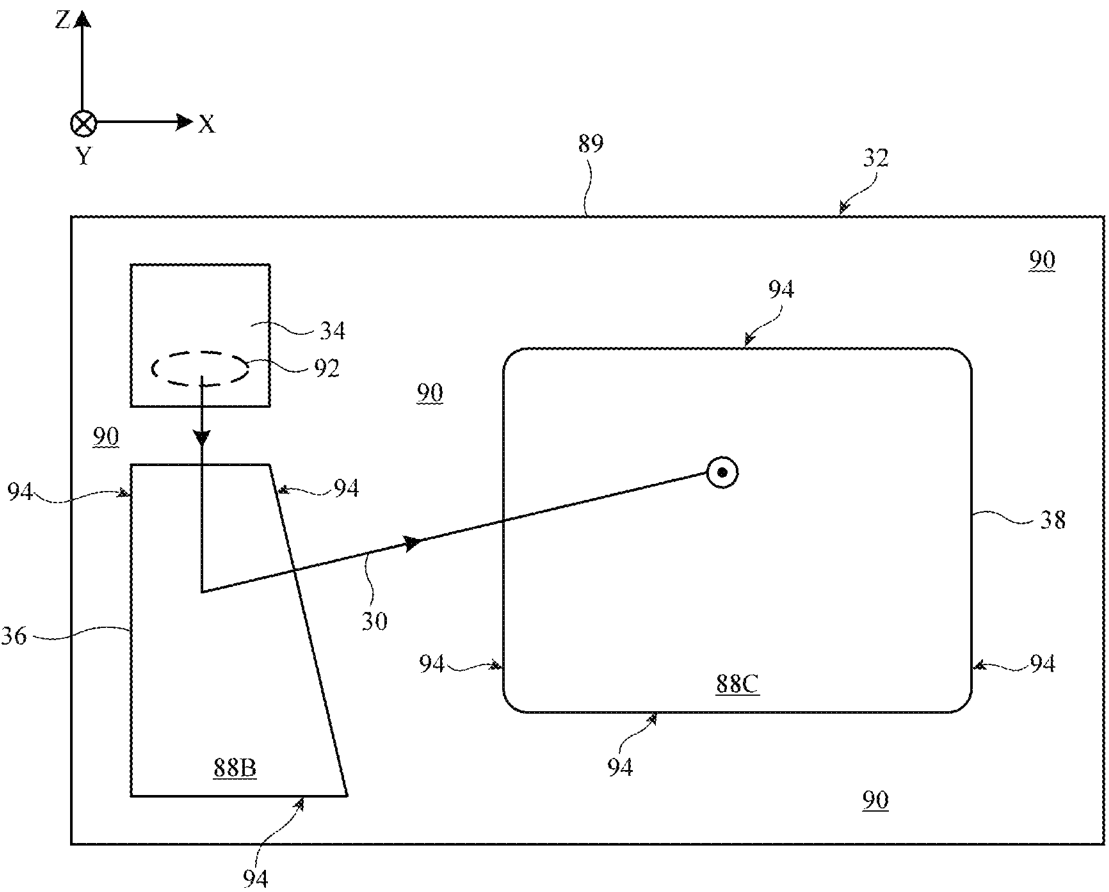
FIG. 4 is a front view of an illustrative waveguide having a first optical coupler formed from a surface relief grating and a second optical coupler formed from volume holograms in accordance with some embodiments.

FIG. 4 is a front view of waveguide 32. As shown in FIG. 4, waveguide 32 may include one or more waveguide substrates 89 (e.g., substrates such as substrates 84 and/or 86 of FIG. 3B). Waveguide substrates 89 may include a single substrate or multiple stacked substrates. Substrate(s) 89 may include one or more layers of grating media. The layers of grating media may include at least a first grating medium layer such as SRG substrate 76 (FIGS. 3A-3B) and a second grating medium layer such as a grating medium layer for recording volume holograms. One or more diffractive grating structures 88 used to form optical couplers for waveguide 32 may be disposed or formed in substrate(s) 89.

For example, substrate(s) 89 may include a first diffractive grating structure 88B (sometimes referred to herein as grating structure 88B or grating(s) 88B) that form cross-coupler 36 and a second diffractive grating structure 88C (sometimes referred to herein as grating structure 88C or grating(s) 88C) that form output coupler 38. Input coupler 34 may be formed from an input coupling prism mounted to waveguide 32 or may, if desired, include a third grating structure. Grating structures 88B and 88C may include volume holograms, surface relief gratings (SRGs) such as SRG 74 of FIGS. 3A-3C, meta-surfaces or meta-gratings, thin film holograms, or any other desired diffractive grating structures.

Input coupler 36 may couple a beam 92 of image light 30 into waveguide 32 and towards cross-coupler 36. Diffractive grating structure 88B in cross-coupler 36 may redirect image light 30 towards diffractive grating structure 88C and may optionally perform pupil expansion on image light 30 (e.g., may split image light 30 into multiple paths to form a larger beam that covers the eye pupil and forms a more uniform image). Diffractive grating structure 88C in output coupler 38 may couple image light 30 out of waveguide 32 and towards the eye box. If desired, diffractive grating structure 88C may also perform pupil expansion on image light 30.

Substrate(s) 89 and thus waveguide 32 may also include one or more regions 90 that are free from diffractive grating structures, diffractive gratings, or optical couplers. Regions 90 may, for example, be free from ridges 78 and troughs 80 of any SRGs (FIGS. 3A-3C) and may, if desired, be free from refractive index modulations of VPHs. Regions 90 may sometimes be referred to herein as grating-free regions 90, inter-grating regions 90, non-grating regions 90, or non-diffractive regions 90. Non-diffractive regions 90 may, for example, include all of the lateral area of substrate(s) 89 that does not include a diffractive grating.

Each diffractive grating structure 88 in substrate(s) 89 may span a corresponding lateral area of substrate(s) 89. The lateral area spanned by each diffractive grating structure 88 is defined (bounded) by the lateral edge(s) 94 of that diffractive grating structure 88. Lateral edges 94 may separate or divide the portions of substrate(s) 89 that include thickness modulations used to form one or more SRG(s) in diffractive grating structures 88 and/or that include refractive index modulations used to form volume holograms from the non-diffractive regions 90 on substrate(s) 89. In other words, lateral edges 94 may define the boundaries between diffractive grating structures 88 and non-diffractive regions 90.

The example of FIG. 4 is merely illustrative and, in general, input coupler 34, cross-coupler 36, and output coupler 38 may have any desired lateral outlines or shapes (e.g., as defined by lateral edges 94). If desired, waveguide 32 may include an optical coupler that both redirects and expands/replicates image light 30 (e.g., for filling as large of an eye box 24 with as uniform-intensity image light 30 as possible). Such an optical coupler, which is sometimes referred to herein as a diamond expander or interleaved coupler, may perform the functionality of both cross coupler 36 and output coupler 38. By using the optical coupler as both a cross-coupler and an output coupler, space may be conserved within the display (e.g., space that would otherwise be occupied by separate cross-coupler and output couplers).

In general, image light 30 is generated by projector 26 (FIG. 2) in a set of two or more color channels. Each color channel may correspond to a respective set or range of wavelengths in the visible spectrum. For example, image light 30 may include image light of a first color channel that includes red wavelengths (e.g., red light), image light of a second color channel that includes green wavelengths (e.g., green light), and image light of a third color channel that includes blue wavelengths (e.g., blue light). This is merely illustrative and, in general, image light 30 may include any desired number of color channels at any desired wavelengths. The color channels may also sometimes be referred to herein as color bands, wavelength channels, wavelength bands, or wavelength ranges.

Figure 5:
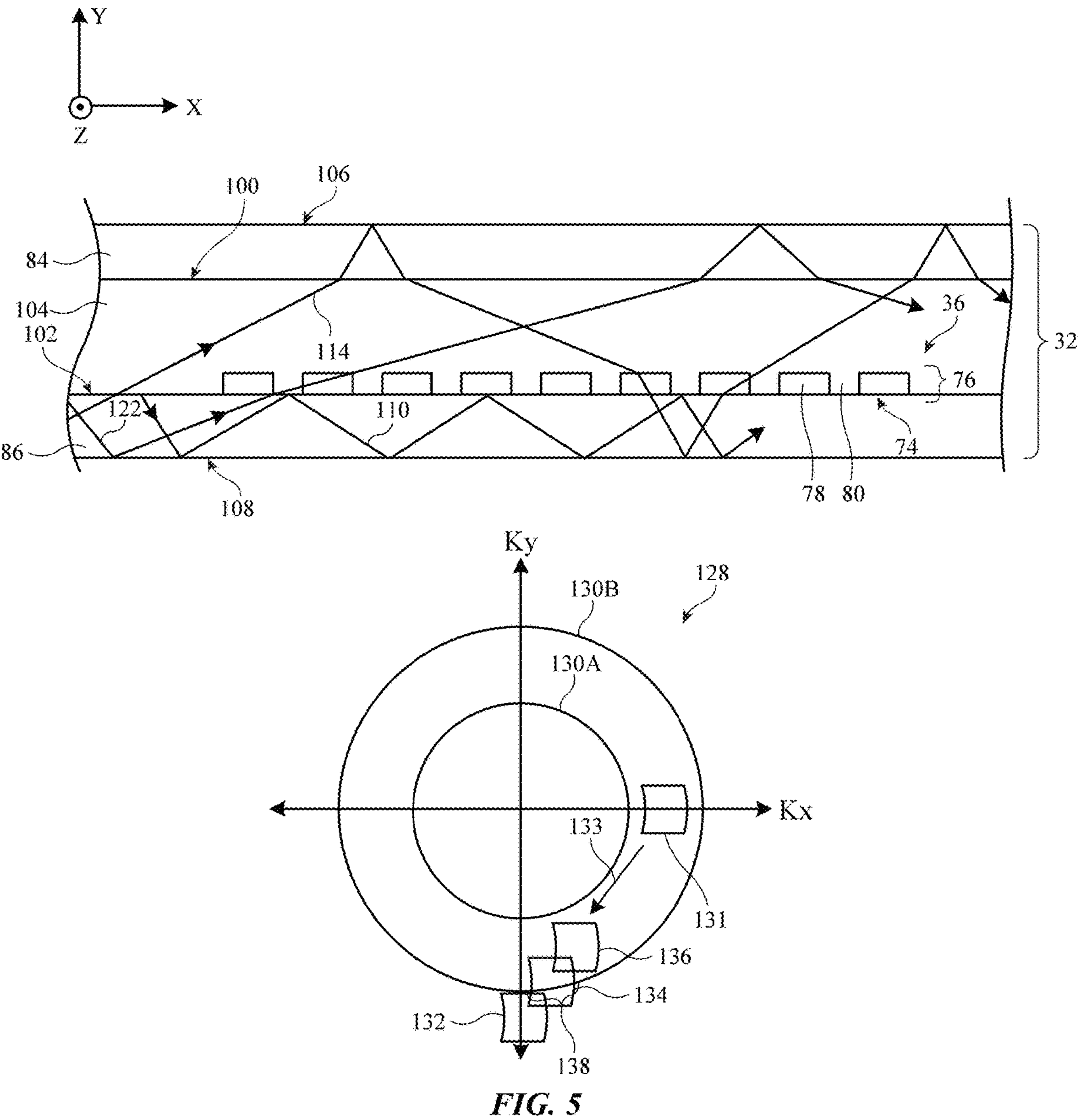
FIG. 5 is a cross-sectional top view of an illustrative waveguide that produces an undesirable dark band in one or more color channels in accordance with some embodiments.

In implementations that are described herein as an example, grating structure 88B includes one or more SRGs such as SRG 74 of FIGS. 3A-3C in an SRG substrate 76 on waveguide 32 whereas grating structure 88C includes a set of volume holograms in an additional layer of grating medium on waveguide 32. FIG. 5 shows a cross-sectional top view of waveguide 32 in an example where cross-coupler 36 includes one or more SRGs 74 and where output coupler 38 includes volume holograms.

As shown in FIG. 5, waveguide 32 may include a layer of grating medium 104 sandwiched (e.g., stacked, layered, or interposed) between a first waveguide substrate such as waveguide substrate 86 and a second waveguide substrate such as waveguide substrate 84. Waveguide substrate 84 may have a first lateral surface 106 facing away from grating medium 104 and an opposing second lateral surface 100 facing (e.g., contacting) grating medium 104. Waveguide substrate 86 may have a first lateral surface 108 facing away from grating medium 104 and an opposing second lateral surface 102 facing (e.g., contacting) grating medium 104. Waveguide 32 may also include an SRG substrate 74 that is layered onto lateral surface 102 of waveguide substrate 86.

Output coupler 36 may be formed from one or more SRGs 74 in SRG substrate 76. SRG 74 may have ridges 78 and troughs 80 in SRG substrate 76. Grating medium 104 may be layered over SRG substrate 76 (e.g., in contact with SRG substrate 76 and SRG 74) and may fill troughs 80 of SRG 74. Troughs 80 may extend all the way through SRG substrate 76 to lateral surface 102 of waveguide substrate 86 or, if desired, a portion of SRG substrate 76 may be disposed between troughs 80 and lateral surface 102.

Grating medium 104 may be a holographic recording medium. A holographic recording may be stored as an optical interference pattern (e.g., alternating regions of different indices of refraction) within a photosensitive optical material such as grating medium 104. The holographic phase grating may be a non-switchable diffractive grating that is encoded with a permanent interference pattern or may be a switchable diffractive grating in which the diffracted light can be modulated by controlling an electric field applied to the grating medium. Multiple holographic phase gratings (holograms) may be recorded within (e.g., superimposed within) the same volume of grating medium 104 if desired. The holographic phase gratings may be, for example, volume holograms or thin-film holograms in the grating medium. Grating medium 104 may include photopolymers, gelatin such as dichromated gelatin, silver halides, holographic polymer dispersed liquid crystal, or other suitable holographic media.

Output coupler 38 (FIG. 4) may be formed from volume holograms that are recorded (written) in grating medium 104 (e.g., to the right of the portion of waveguide 32 illustrated in FIG. 5). Each volume hologram may, for example, be recorded within grating medium 104 as a respective modulation in the refractive index n of grating medium 104 (e.g., where lines of constant refractive index in grating medium 104 form the fringes of the hologram). The volume holograms may be recorded using two interfering recording beams of light (e.g., a signal beam and a reference beam) in a holographic recording (writing) apparatus during the manufacture of system 10. The interference pattern of the beams of light is recorded as a modulation in refractive index n of grating medium 104. Once the interference pattern has been recorded in grating medium 104, the grating medium 104 may be developed (cured) using curing light. Once cured, no further volume holograms can be recorded or written in the grating medium.

Each volume hologram in output coupler 38 (FIG. 3) may be defined or characterized by a corresponding grating vector k (e.g., in momentum space or k-space). Grating vector k has a magnitude (grating frequency) that corresponds to the wavelength of light diffracted by that volume hologram (e.g., a wavelength at which light is Bragg-matched to the volume hologram). The grating frequency is also related to the spacing between the lines of constant index. The direction of grating vector k is orthogonal to the lines of constant refractive index in the volume hologram. The direction of grating vector k is also related to the incident angle and the output/diffracted angle with which the volume hologram diffracts light (e.g., the direction of grating vector k determines the incident and output/diffracted angles of the volume hologram that satisfy its Bragg matching condition). In other words, the direction of grating vector k identifies the incident angle of light that is diffracted by the volume hologram as well as the corresponding output (diffracted) angle that the light is diffracted onto. The volume hologram may diffract light from an incident angle onto an output angle but also conversely diffracts light incident from the output angle onto the incident angle.

Multiple volume holograms may be superimposed or multiplexed within the same volume of grating medium 104. Put differently, at a given point within the volume of grating medium 104, there may be one or more superimposed volume holograms formed from corresponding refractive index modulations that are superimposed onto each other at that point of the grating medium. As modulated, the refractive index may sometimes be referred to herein as modulated refractive index dn (e.g., a refractive index that varies spatially across the area of the grating medium). The multiplexed volume holograms may have different grating frequencies (grating vector magnitudes) for diffracting a range of different wavelengths of light and/or different orientations (grating vector directions) for diffracting light from a range of incident angles onto a corresponding range of output angles. Additionally or alternatively, the multiplexed volume holograms may, if desired, perform expansion on the diffracted light (e.g., by collectively diffracting light from a single incident angle onto a range of different output angles).

During display operations, image light 30 may be incident upon cross-coupler 36 (as shown by rays 110, 114, and 122). SRG 74 in cross-coupler 36 may diffract the image light to redirect the image light towards output coupler 38 (e.g., as shown in FIG. 4) and/or to expand the image light. In practice, a medium containing volume holograms, such as grating medium 104, is formed from a material having a lower refractive index than the material used to form SRG substrate 76 (e.g., SRG substrate 76 may have a refractive index less than the refractive index of grating medium 104). If care is not taken, this can cause diffraction of image light 30 by the SRG 74 in cross-coupler 36 to produce cosmetic artifacts such as undesirable dark bands in one or more color channels of image light 30 by the time the image light is provided to the eye box. These dark bands can be visually unappealing and can distract the user from viewing the images in image light 30.

K-space diagram 128 of FIG. 5 (e.g., a two-dimensional projection of a three-dimensional k-sphere) illustrates how the SRG 74 in cross-coupler 36 can produce an undesirable dark band. Region 131 of k-space diagram 128 plots the field of view of image light 30 as coupled into waveguide 32 by input coupler 34 (FIG. 4) and as incident upon cross-coupler 36 (prior to diffraction by SRG 74). The TIR range of waveguide 32 (e.g., waveguide substrate 86) is defined by the volume of the k-sphere between circles 130A and 130B of diagram 128 (e.g., where circles 130A and 130B are two-dimensional projections of corresponding spheres in three-dimensional k-space). Since region 131 lies entirely within circles 130A and 130B (e.g., within the TIR range of the waveguide), all wavelengths across the entire field of view of image light 30 propagates along waveguide 32 via TIR to cross-coupler 36.

Arrow 133 of diagram 128 represents the first diffraction by the SRG 74 in cross-coupler 36 on the incident image light 30. This diffraction may diffract different color channels of image light 30 onto slightly different angles (e.g., into different regions of k-space via dispersion). For example, as shown in plot 128, the first diffraction may diffract a first color channel or wavelength range of image light 30 (e.g., the red color channel of image light 30) onto region 132, may diffract a second color channel or wavelength range of image light 30 (e.g., the green color channel of image light 30) onto region 134, and may diffract a third color channel or wavelength range of image light 30 (e.g., the blue color channel of image light 30) onto region 136 of k-space.

In practice, it may be desirable for the field of view of image light 30 to be as large as possible (e.g., to fill as large an eye box as possible with uniform levels of image light in all color channels). However, when the field of view is at least a minimum size, if care is not taken, circle 130B will intersect or cut through the field of view of one or more of the color channels. As such, a first portion of the field of view of that color channel will remain within the TIR range of the waveguide whereas a second portion of the field view of that color channel will fall outside the TIR range after the first interaction with SRG 74. In other words, the TIR transition angle of waveguide 32 may extend through the FOV of that color channel.

For example, as shown in diagram 128 of FIG. 5, a portion (segment or arc) 138 of circle 130B runs/cuts through the center of the field of view of region 138 (e.g., the second color channel). This may cause a first portion of the field of view of the second color channel to fall outside the TIR range of the waveguide whereas a second portion of the field of view of the second color channel remains within the TIR range of the waveguide. Portion 138 of circle 130B may represent the TIR transition angle of the second color channel (region 134) and may therefore sometimes be referred to herein as TIR transition angle 138 (e.g., where angles of the field of view above TIR transition angle 138 remain within the TIR range of waveguide 32 after diffraction by the SRG 74 in cross-coupler 36 and where angles of the field of view below TIR transition angle 138 fall outside the TIR range of waveguide 32).

The top portion of FIG. 5 shows how the second color channel of image light 30 may propagate through waveguide 32 for different portions of the field of view of image light 30. Rays 110, 114, and 122 illustrate different (angular) regions of the field of view of the second color channel of image light 30 as incident upon cross-coupler 36. Rays 110, 114, and 122 may be coupled into waveguide 32 (e.g., waveguide substrate 86) within the TIR range of waveguide 32 by input coupler 34. Rays 110, 114, and 122 may propagate along (within) waveguide substrate 86 via TIR and may be incident upon SRG 74 in cross-coupler 36 from within the TIR range of waveguide substrate 86 (e.g., within region 131, which lies between circles 130A and 130B of diagram 128 and thus the TIR range of waveguide substrate 86).

Ray 110 of FIG. 5 illustrates the second portion of the field of view of the second color channel that remains within the TIR range of waveguide 32 after the first diffraction by the SRG 74 in cross-coupler 36 (e.g., the portion of region 134 in diagram 128 that is above TIR transition angle 138). As shown by ray 110, the second portion of the field of view of the second color channel propagates via TIR along (within) waveguide substrate 86 and exhibits a relatively short bounce length. When ray 110 first hits the SRG 74 in cross-coupler 36, SRG 74 diffracts some of ray 110 in one or more desired directions (e.g., towards output coupler 38 of FIG. 4, to perform pupil expansion, etc.). However, ray 110 remains within the TIR range of waveguide substrate 86 after each interaction with SRG 74 (e.g., because the second portion of the field of view of the second color channel lies between circles 130A and 130B of diagram 128). As such, the second portion of the field of view of the second color channel may hit SRG 74 multiple times while propagating via TIR. This may maximize the amount of the second portion of the field of view of the second color channel that is redirected towards output coupler 38 (FIG. 4) and thus received at the eye box, thereby causing the second portion of the field of view of the second color channel to exhibit relatively high brightness at the eye box.

Ray 114 of FIG. 5 illustrates the first portion of the field of view of the second color channel that falls outside the TIR range of waveguide 32 after the first diffraction by the SRG 74 in cross-coupler 36 (e.g., the portion of region 134 in diagram 128 that is below TIR transition angle 138). As shown by ray 114, the first portion of the field of view of the second color channel propagates via TIR along (within) waveguide substrate 86 and exhibits a relatively long bounce length. When ray 114 first hits the SRG 74 in cross-coupler 36, SRG 74 diffracts some of ray 114 in one or more desired directions (e.g., towards output coupler 38 of FIG. 4, to perform pupil expansion, etc.). However, ray 114 falls outside the TIR range of waveguide substrate 86 after first hitting SRG 74 (e.g., because the first portion of the field of view of the second color channel lies outside of circle 130B of diagram 128). As such, the first portion of the field of view of the second color channel view may hit SRG 74 very few times while propagating via TIR. This may reduce the amount of the first portion of the field of view of the second color channel that is redirected towards output coupler 38 (FIG. 4) and thus received at the eye box, thereby causing the first portion of the field of view of the second color channel to exhibit relatively low brightness at the eye box.

Ray 122 of FIG. 5 illustrates a third portion of the field of view of the second color channel that lies along (at or on) TIR transition angle 138 in diagram 128 (e.g., at angles at the boundary between remaining within the TIR range and falling outside the TIR range of waveguide substrate 86). As shown by ray 122, after hitting the SRG 74 in cross-coupler 36 for the first time, the third portion of the field of view of the second color channel propagates at a very low angle into grating medium 104 and hits SRG 74 very few or no additional times. This may minimize the amount of the third portion of the field of view of the second color channel that is redirected towards output coupler 38 (FIG. 4) and thus received at the eye box, thereby causing the third portion of the field of view of the second color channel to exhibit minimal brightness at the eye box. This may produce an undesirable dark band across the field of view of image light 30 for the second color channel in the image light that reaches the eye box, which can be unappealing or distracting to a user.

Figure 6:
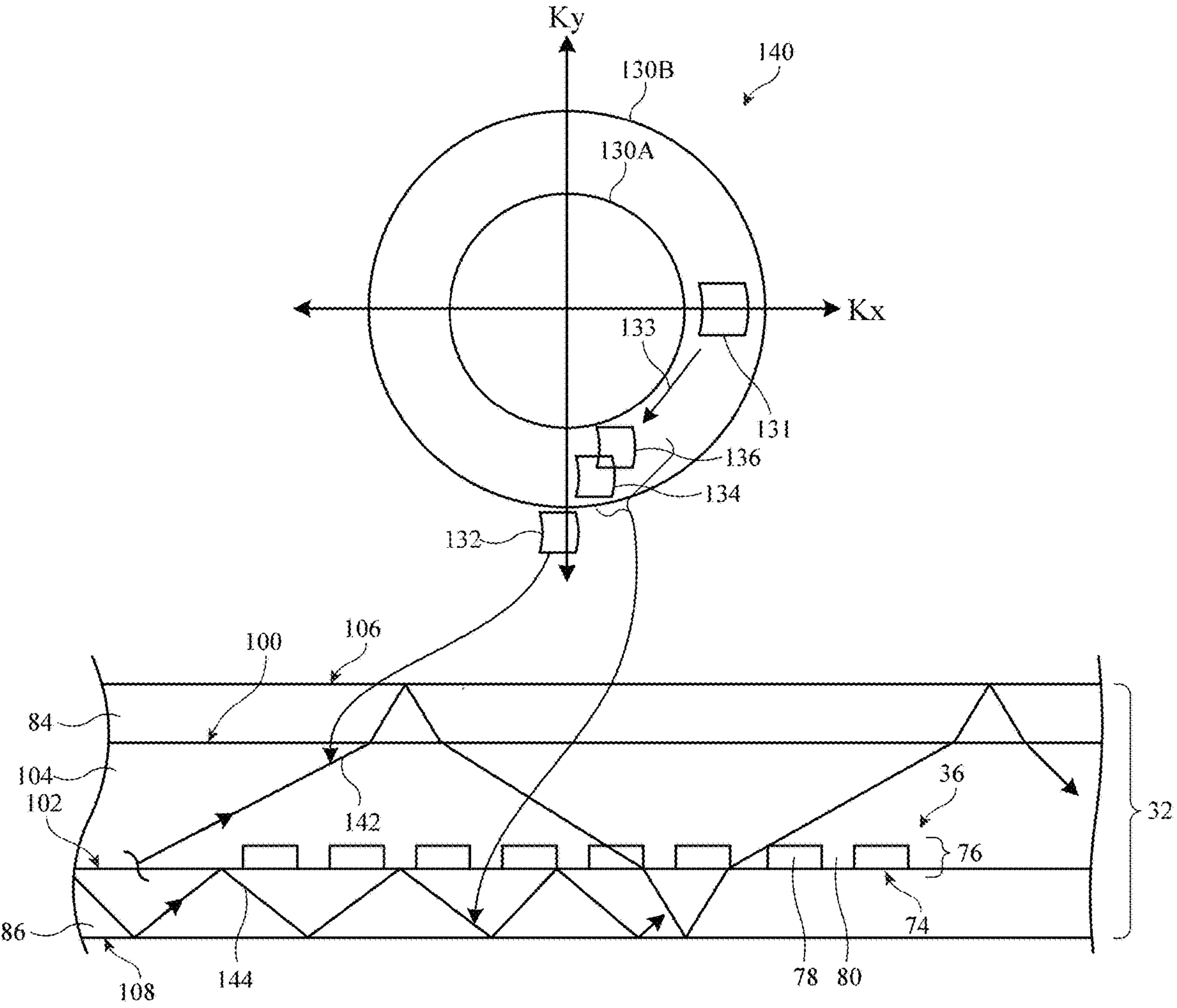
FIG. 6 is a cross-sectional top view of an illustrative waveguide having a surface relief grating that mitigates dark bands by diffracting image light with a total internal reflection (TIR) transition between color channels in accordance with some embodiments.

To mitigate these issues, SRG 74 may be configured to diffract image light 30 in a manner such that the TIR transition angle 138 of waveguide substrate 86 (e.g., circle 130B in diagram 128) lies between different color channels and does not intersect the field of view of any of the color channels of the image light after the first diffraction of the image light by SRG 74, as shown in the example of FIG. 6. As shown in k-space diagram 140 of FIG. 6, the entire field of view of all color channels of image light 30 may be incident upon SRG 74 (e.g., from within the TIR range of waveguide substrate 86) within region 131.

The spatial modulations in the ridges 78 and troughs 80 of SRG 74 (e.g., ridge widths, trough widths, ridge heights, trough depths, duty cycle, blaze angle, periodicity, ridge shape, trough shape, frequency, etc.) may be selected to configure SRG 74 to diffract the image light incident within region 131 (e.g., as illustrated by arrow 133) in a manner such that circle 130B does not intersect the field of view of any of the color channels of image light 30 after the first diffraction by SRG 74 (e.g., such that circle 130B extends between the field(s) of view of one or more of the color channels and the field(s) of view of the remaining color channels in image light 30).

For example, as shown in FIG. 6, SRG 74 may diffract the first color channel of image light 30 onto a region 132 that lies entirely outside of circle 130B (e.g., outside the TIR range of waveguide substrate 86 or at a first side of the TIR transition angle). At the same time, SRG 74 may diffract the second color channel of image light 30 onto a region 134 that lies entirely within circle 130B (e.g., within the TIR range of waveguide substrate 86 or at a second side of the TIR transition angle) and may diffract the third color channel of image light 30 onto a region 136 that also lies entirely within circle 130B (e.g., within the TIR range of waveguide substrate 86 or at the second side of the TIR transition angle). As such, circle 130B extends between regions 132 and 134 and does not intersect (or intersects only a small portion of) any of regions 132, 134, and 136. This may cause an entirety or substantially all of the field of view of the first color channel of image light 30 (region 132) to fall outside the TIR range of waveguide 32 after the first diffraction by SRG 74, whereas an entirety or substantially all of the field of view of the second color channel of image light 30 (region 134) and an entirety or substantially all of the field of view of the third color channel of image light 30 (region 136) falls within the TIR range of waveguide 32 after the first diffraction by SRG 74. This may serve to prevent the formation of unsightly dark bands in any of the color channels of image light 30 that reaches the eye box.

The bottom portion of FIG. 6 shows how configuring SRG 74 in this way may cause the different color channels of image light 30 to propagate within waveguide 32. Ray 144 illustrates propagation of the first color channel of image light 30. Ray 142 illustrates propagation of the second and third color channels of image light 30. Rays 142 and 144 may be coupled into waveguide 32 (e.g., waveguide substrate 86) within the TIR range of waveguide 32 by input coupler 34. Rays 142 and 144 may propagate along (within) waveguide substrate 86 via TIR and may be incident upon SRG 74 in cross-coupler 36 from within the TIR range of waveguide substrate 86 (e.g., within region 131, which lies between circles 130A and 130B of diagram 140 and thus the TIR range of waveguide substrate 86).

Ray 144 illustrates propagation of the second and third color channels of image light 30. As shown by ray 144 and regions 134 and 136 of diagram 140, an entirety or substantially all of the field of view of the second and third color channels of image light 30 hits SRG 74 in cross-coupler 36, which diffracts at least some of the power of ray 144 in one or more desired directions (e.g., towards output coupler 38 of FIG. 4, to perform pupil expansion, etc.). However, ray 144 remains within the TIR range of waveguide substrate 86 after each interaction with SRG 74 (e.g., because the entire field of view of the second and third color channel lie within the TIR range of waveguide 32).

Ray 142 illustrates propagation of the first color channel of image light 30. As shown by ray 142 and region 132 of diagram 140, an entirety or substantially all of the field of view of the first color channel of image light 30 hits SRG 74 in cross-coupler 36, which diffracts some of the power in ray 142 in one or more desired directions (e.g., towards output coupler 38 of FIG. 4, to perform pupil expansion, etc.). However, ray 142 falls outside the TIR range of waveguide substrate 86 after the first interaction with SRG 74 (e.g., because the entire field of view of the first color channel lies outside the TIR range of waveguide 32). Since none of the color channels has a field of view that includes TIR transition angle 138 (e.g., since none of the color channels has a field of view that overlaps circle 130B after the first diffraction by SRG 74), the light path associated with ray 122 of FIG. 5 is never formed, preventing formation of any corresponding dark band in the image light at the eye box. By configuring SRG 74 in this way, image light 30 may also have a relatively large field of view without incurring dark bands (e.g., greater than or equal to thirty degrees by fifteen degrees, greater than twenty degrees by ten degrees, etc.).

The example of FIG. 6 is merely illustrative. Alternatively, the region of diagram 140 lying outside circle 130B may represent the TIR range of waveguide 32. In this implementation, region 131 may also lie outside circle 130B, the entire field of view of the first color channel remains in the TIR range of waveguide substrate 86 after the first interaction with SRG 74, the entire field of view of the first color channel of image light 30 propagates as shown by ray 144, the entire fields of view of the second and third color channels fall outside the TIR range of waveguide substrate 86 after the first interaction with SRG 74, and the entire fields of view of the second and third color channels of image light 30 propagate as shown by ray 142. In general, image light 30 may contain any desired number of color channels and SRG 74 may diffract image light 30 in a manner such that circle 130B of diagram 140 and the TIR transition angle 138 of waveguide substrate 86 lies between the fields of view of any pair of the color channels (or between the fields of view of any desired sets of the color channels) without intersecting, dividing, or cutting into the fields of view, thereby mitigating the formation of dark bands in the image light.

Figure 7:
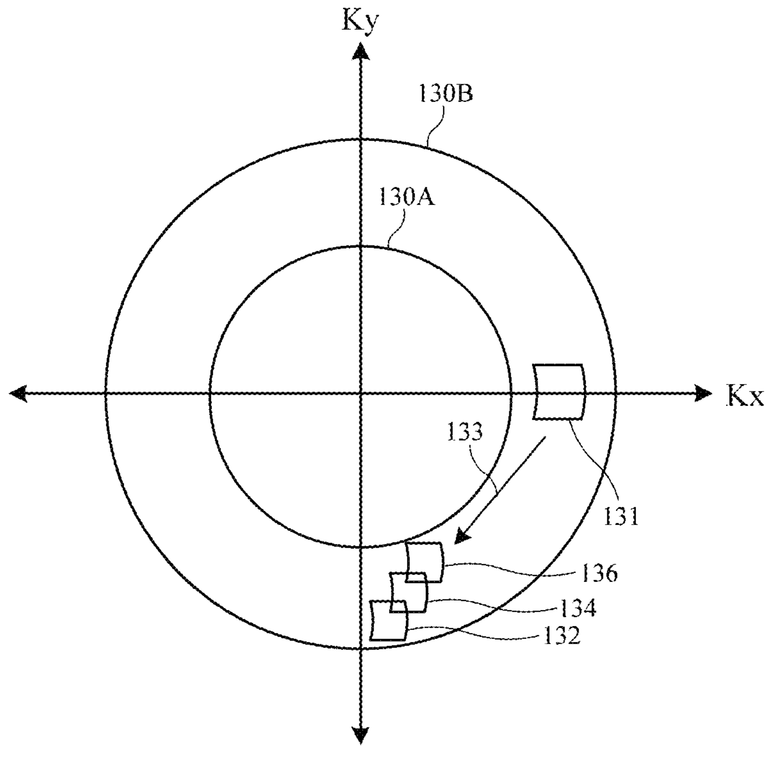
FIG. 7 is a k-space diagram showing how illustrative image light may be provided with a small field of view that mitigates dark bands in accordance with some embodiments.

Additionally or alternatively, the field of view of image light 30 may be reduced to prevent the formation of dark bands. For example, as shown in the k-space diagram of FIG. 7, by reducing the size of the field of view of image light 30 (e.g., as provided by projector 26 and/or optics that direct the light from the projector to the waveguide), the first diffraction by SRG 74 may cause an entirety of the field of view of each color band of the image light (e.g., regions 132-136) to lie between circles 130A and 130B and thus within the TIR range of the waveguide. This prevents the fields of view of any of the color channels from including the TIR transition angle. The field of view of image light 30 in FIG. 7 may, for example, less than thirty degrees by less than fifteen degrees (e.g., twenty degrees by ten degrees).

As used herein, the term "concurrent" means at least partially overlapping in time. In other words, first and second events are referred to herein as being "concurrent" with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent."

System 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. An electronic device comprising:

a waveguide having a first substrate, a second substrate, and a grating medium sandwiched between the first substrate and the second substrate, wherein the first substrate is configured to propagate at least a first color channel and a second color channel of light via total internal reflection (TIR);

a third substrate on the waveguide;

a first optical coupler configured to couple the light into the waveguide;

a second optical coupler configured to couple the light out of the waveguide, the second optical coupler comprising volume holograms in the grating medium; and a third optical coupler configured to redirect the light from the first optical coupler towards the second optical coupler, wherein the third optical coupler comprises a surface relief grating (SRG) in the third substrate, the SRG is configured to diffract the first color channel of the light onto first angles within a TIR range of the first substrate, and the SRG is configured to diffract the second color channel of the light onto second angles outside the TIR range of the first substrate.

2. The electronic device of claim 1, wherein the first substrate is configured to propagate a third color channel of the light via TIR and the SRG is configured to diffract the third color channel of the light onto third angles outside the TIR range of the first substrate.

3. The electronic device of claim 2, wherein the first color channel comprises red wavelengths, the second color channel comprises green wavelengths, and the third color channel comprises blue wavelengths.

4. The electronic device of claim 1, wherein the first substrate is configured to propagate a third color channel of the light via TIR and the SRG is configured to diffract the third color channel of the light onto third angles within the TIR range of the first substrate.

5. The electronic device of claim 4, wherein the first color channel comprises green wavelengths, the second color channel comprises red wavelengths, and the third color channel comprises blue wavelengths.

6. The electronic device of claim 1, wherein the third substrate is layered between the grating medium and the first substrate.

7. The electronic device of claim 6, wherein the grating medium contacts the first substrate, the SRG comprises grooves and troughs, and the grating medium fills the troughs.

8. The electronic device of claim 1, wherein the first color channel of the light has a first field of view, the second color channel of the light has a second field of view, an entirety of the first field of view is within the TIR range of the first substrate after diffraction by the SRG, and an entirety of the second field of view is outside the TIR range of the first substrate after diffraction by the SRG.

9. The electronic device of claim 1, further comprising:

an input coupling prism configured to couple the first color channel of the light and the second color channel of the light into the first substrate.

10. An electronic device comprising:

a waveguide having a first substrate, a second substrate, a grating medium interposed between the first substrate and the second substrate, and a third substrate layered between the grating medium and the first substrate, the waveguide being configured to propagate light via total internal reflection (TIR);

volume holograms in the grating medium and configured to couple the light out of the waveguide; and a surface relief grating (SRG) in the third substrate, wherein the SRG is configured to receive the light from within the first substrate, the SRG is configured to diffract the light towards the volume holograms, the light has a first color channel, the light has a second color channel different from the first color channel, the SRG is configured to diffract the first color channel of the light onto a first side of a TIR transition angle of the first substrate, and the SRG is configured to diffract the second color of the light onto a second side of the TIR transition angle of the first substrate.

11. The electronic device of claim 10, wherein the first color channel of the light has a first field of view, the second color channel of the light has a second field of view, and the SRG is configured to diffract an entirety of the first field of view onto first angles at the first side of the TIR transition angle.

12. The electronic device of claim 11, wherein the SRG is configured to diffract an entirety of the second field of view onto second angles at the second side of the TIR transition angle.

13. The electronic device of claim 12, wherein the TIR transition angle is between the first field of view and the second field of view after diffraction of the first color channel of the light and the second color channel of the light by the SRG.

14. The electronic device of claim 10, wherein the first color channel comprises red wavelengths and the second color channel comprises green wavelengths.

15. The electronic device of claim 10, wherein the first color channel of the light passes from the first substrate into the grating medium after a first interaction of the first color channel of the light with the SRG.

16. The electronic device of claim 15, wherein the second color channel of the light continues to propagate within the first substrate via TIR after a first interaction of the second color channel of the light with the SRG.

17. The electronic device of claim 10, wherein the grating medium has a first refractive index and the third substrate has a second refractive index greater than the first refractive index.

18. An electronic device comprising:

a first substrate;

a second substrate;

a grating medium interposed between the first substrate and the second substrate, wherein the first substrate is configured to propagate at least a first color channel and a second color channel of light via total internal reflection (TIR);

a third substrate layered between the first substrate and the grating medium; and a surface relief grating (SRG) in the third substrate, wherein the SRG is configured to diffract the first color channel of the light from a first k-space region onto a second k-space region, and diffract the second color channel of the light from the first k-space region onto a third k-space region, the first substrate having a TIR transition angle between the second k-space region and the third k-space region.

19. The electronic device of claim 18, wherein the first substrate is configured to propagate a third color channel of the light via TIR, the SRG is configured to diffract the third color channel of the light from the first k-space region onto a fourth k-space region different from the third k-space region, the TIR transition angle of the first substrate is between the second k-space region and the fourth k-space region, the first color channel comprises red wavelengths, the second color channel comprises green wavelengths, and the third color channel comprises blue wavelengths.

20. The electronic device of claim 18, further comprising:

volume holograms in the grating medium, wherein the volume holograms are configured to receive the first color channel and the second color channel of the light from the SRG, and wherein the volume holograms are configured to diffract the first color channel and the second color channel of the light towards an eye box.

* * * * *